United States Patent Office 2,875,853
Patented Mar. 3, 1959

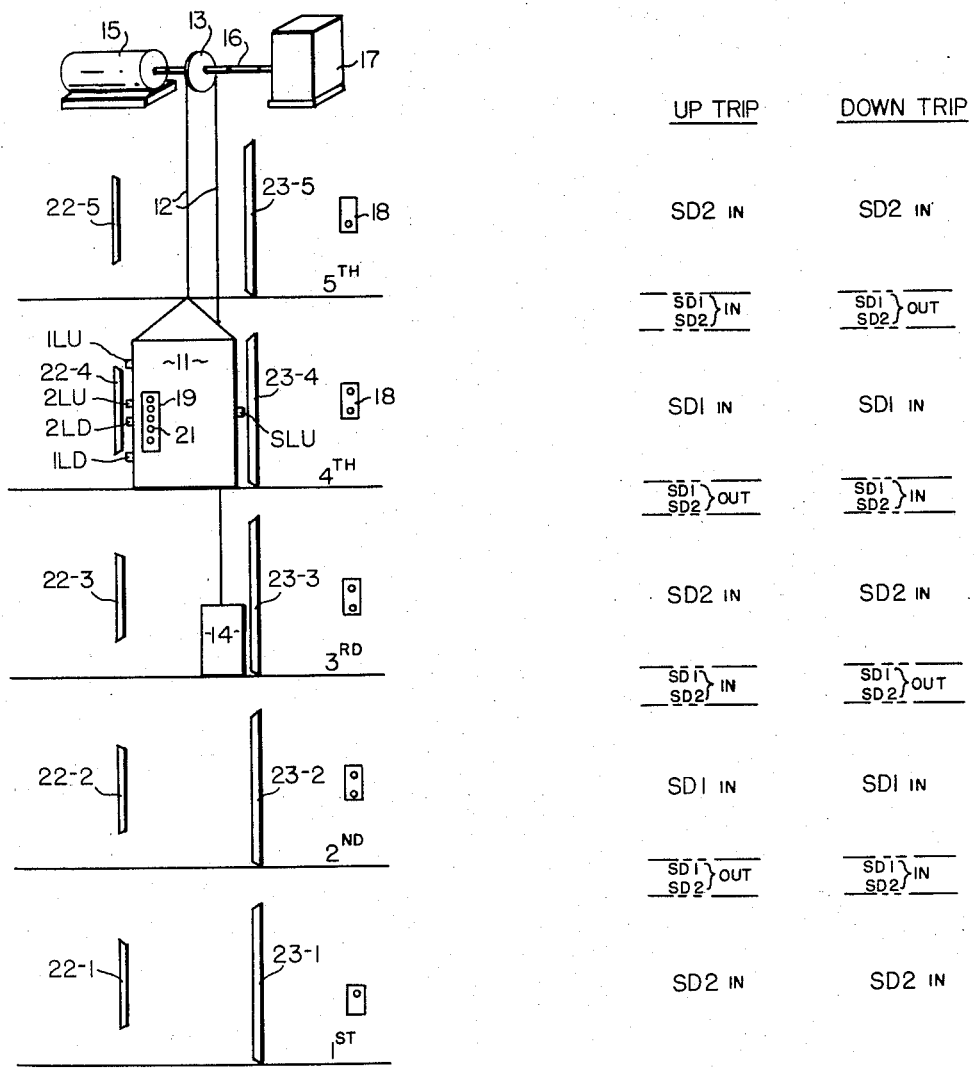

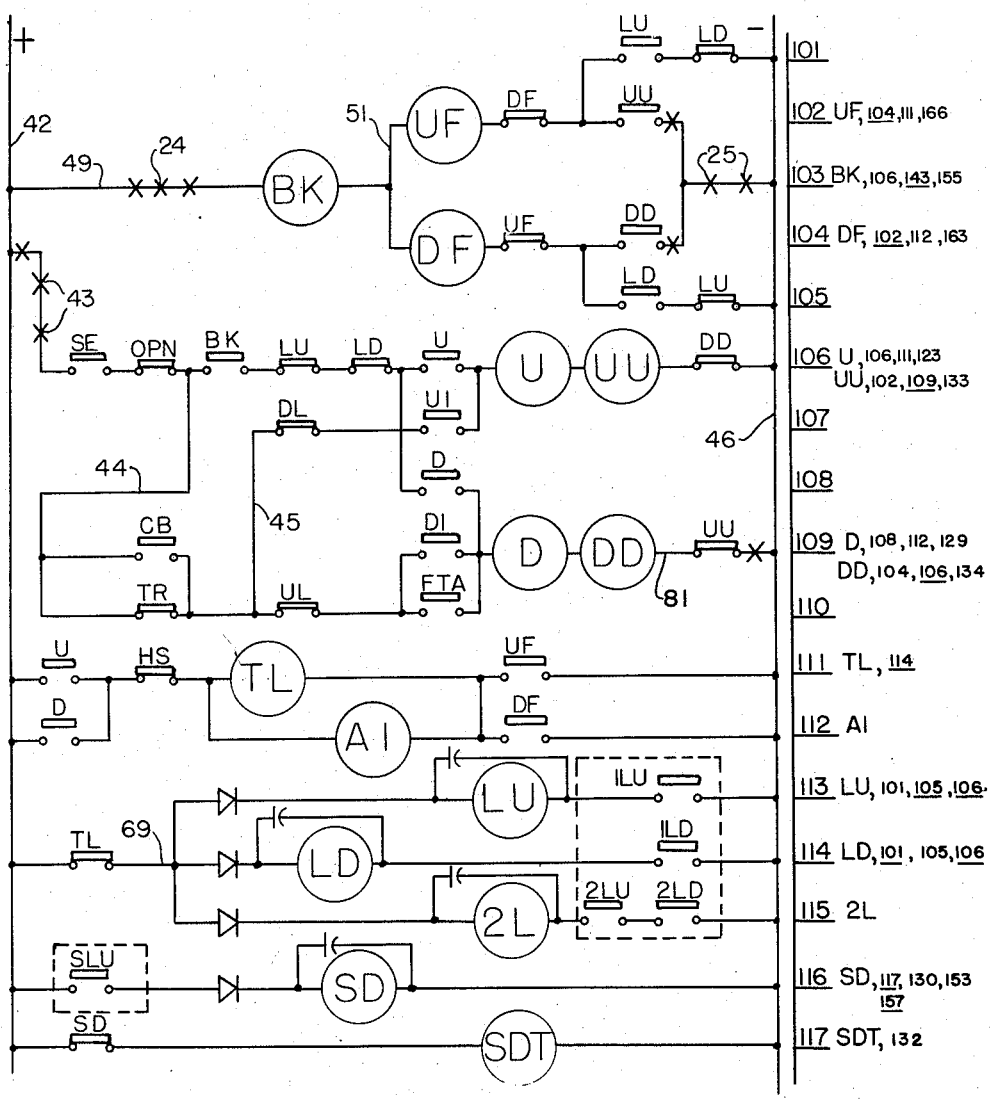
Fig. III
INVENTORS
JOSEPH H. BORDEN
RAYMOND A. BURGY
BY
Marshall, Marshall & Yeasting
ATTORNEYS

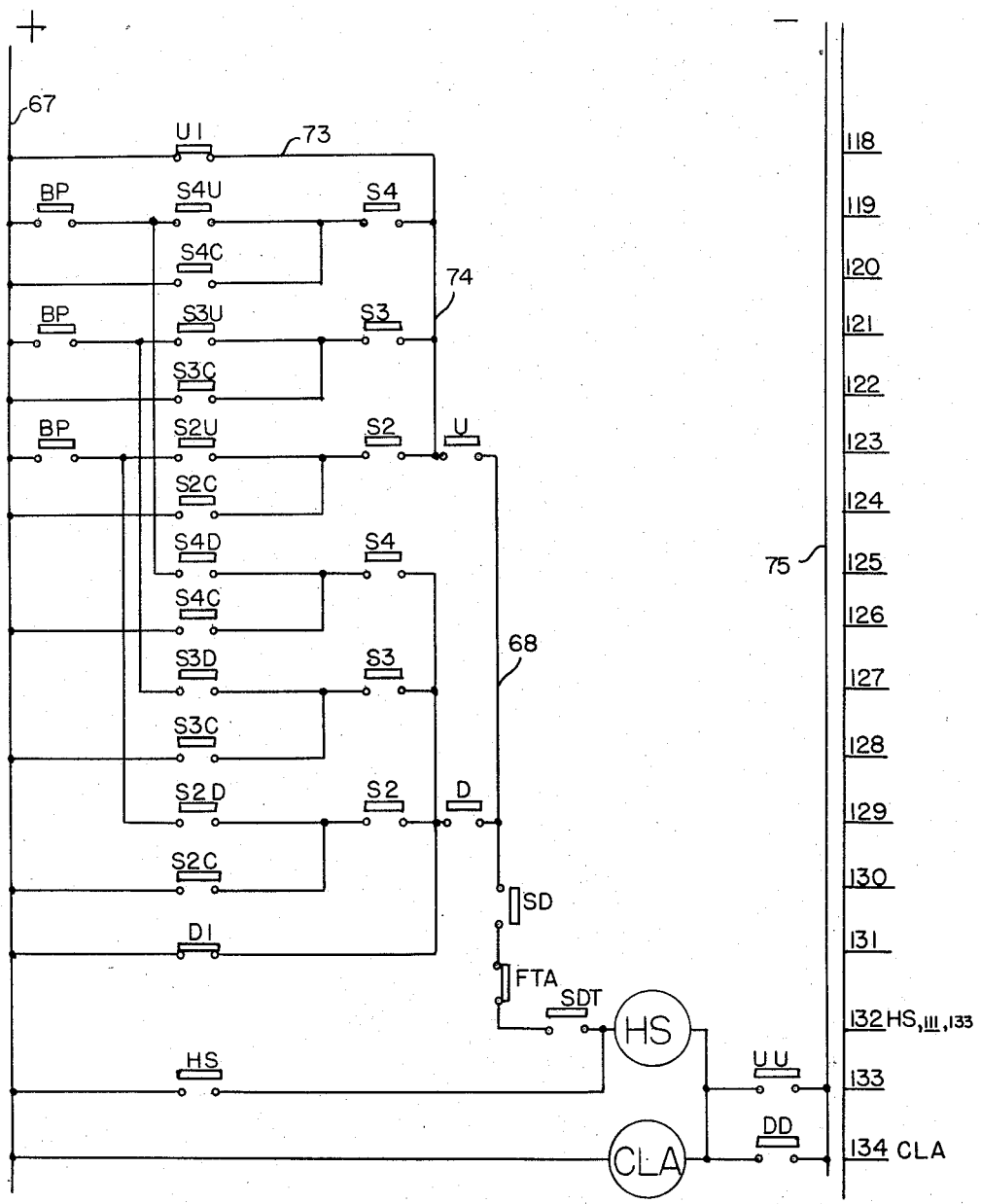

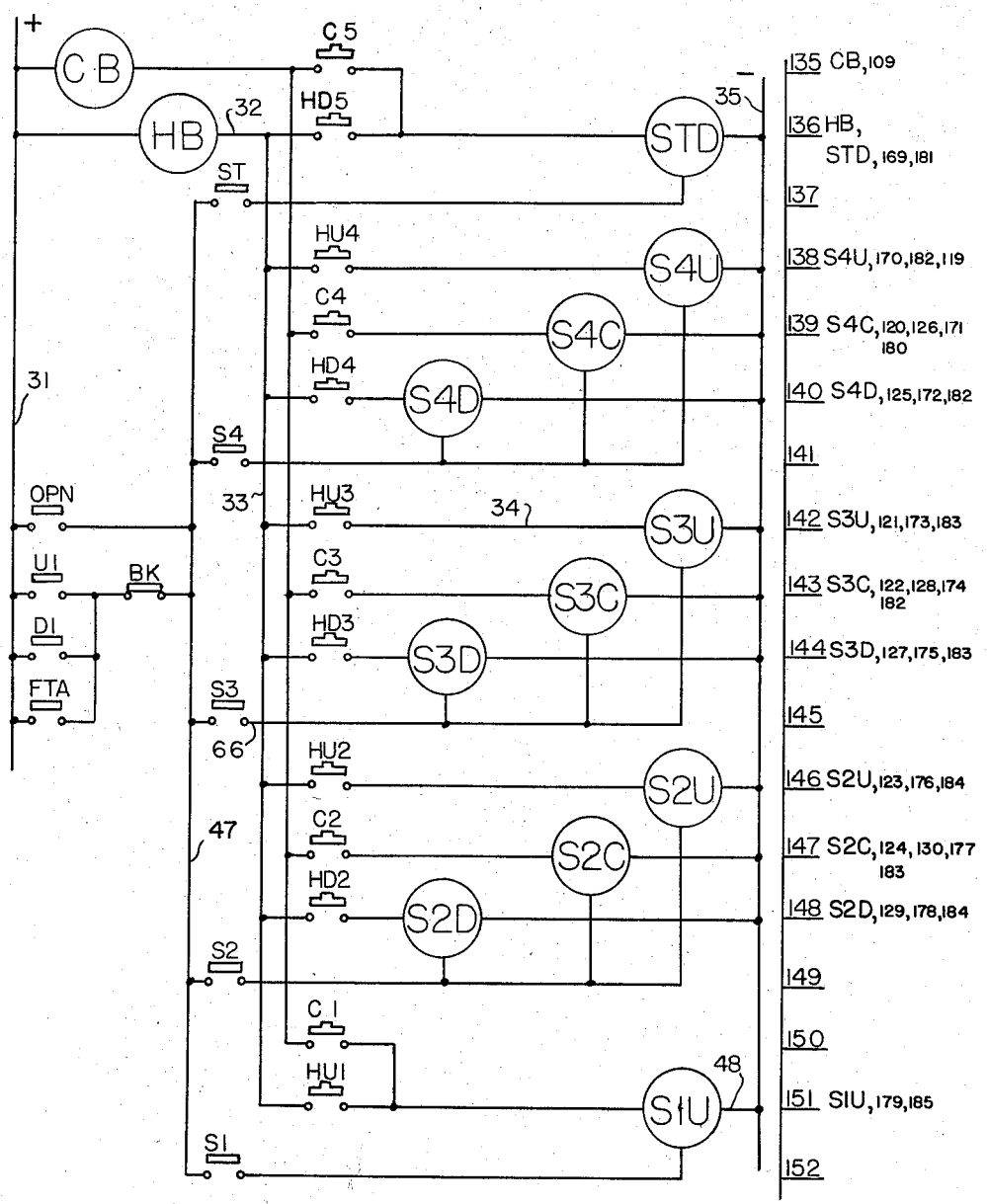

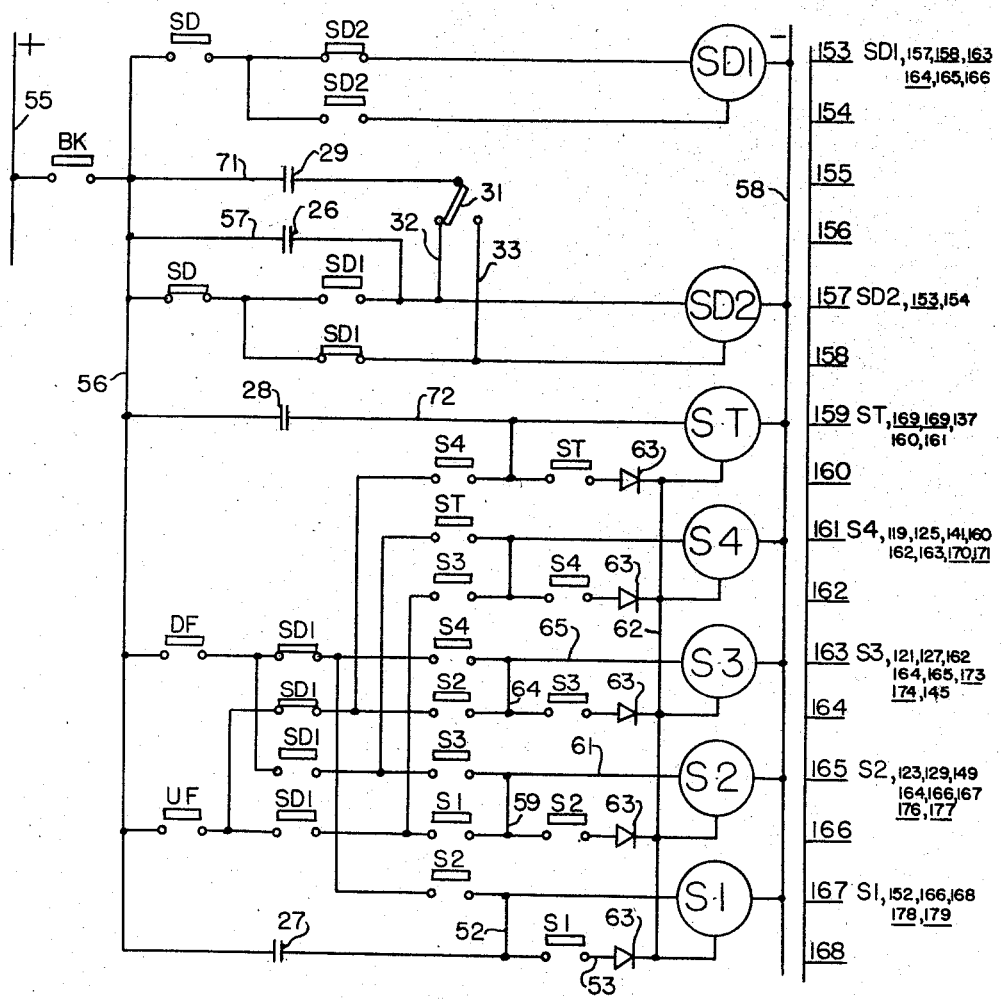
Fig. VI
INVENTORS
JOSEPH H. BORDEN
RAYMOND A. BURGY
ATTORNEYS

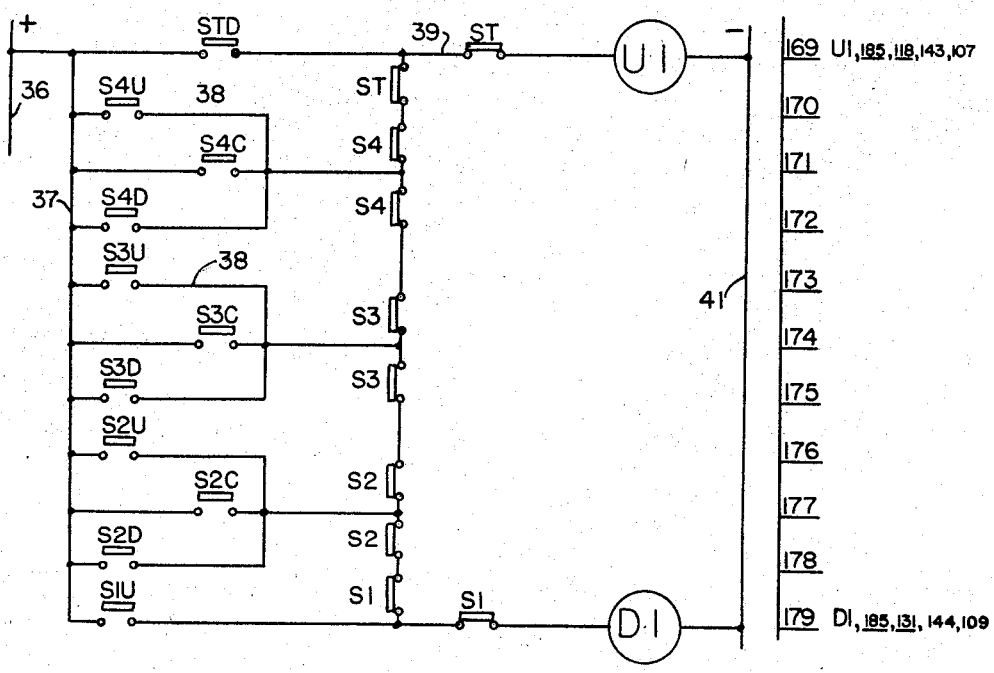
Fig. VII
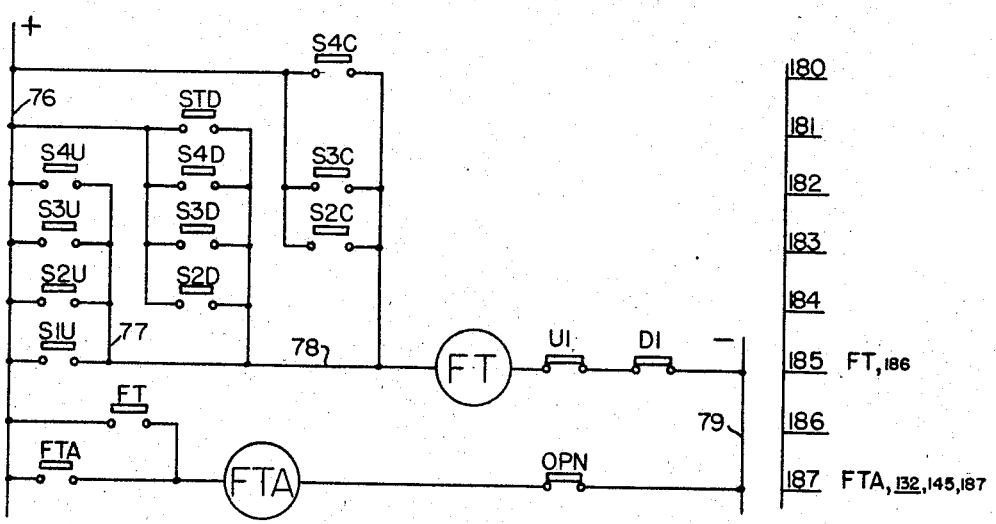
Fig. VIII

2,875,853

ELEVATOR CONTROLS

Joseph H. Borden, Toledo, and Raymond A. Burgy, Maumee, Ohio, assignors to Toledo Scale Corporation, Toledo, Ohio, a corporation of Ohio Application March 3, 1958, Serial No. 718,605

18 Claims. (Cl. 187—29)

This invention relates to elevator signal and control systems and more particularly to means for establishing and maintaining desired relationships between an elevator car at its several positions along its path of travel and the signal and control functions for that car.

Heretofore, the signal and control circuits operated during the travel of an elevator car along its hatchway have been actuated by various techniques. Many modern systems employ commutating devices which simulate the car travel by moving brushes over an array of contacts. These devices, commonly termed floor selector machines, are complex and therefore are expensive to build and maintain. Modifications of early controls for signal devices which were actuated by a given relationship between the elevator car and a device in the hatchway along which the car travels have also been employed to effect floor selection functions such as the stopping of a car at a landing in response to a car or hall call, the indication of car position, the cancellation of calls in response to a car stop, and the like. Typical of these floor selector devices are those employing bidirectional stepping switches which are advanced as a car passes between landings to disable the circuits associated with the preceding landing and condition those for the next landing as shown in F. E. Lewis, United States Patent 1,981,601, for "Elevator Control System," which issued November 20, 1934. Another technique has involved establishing a self-balancing resistance bridge which is altered by car movement so that the self-balancing device is brought into operation, that device being coupled to signal or control circuit elements to operate them in accordance with the balance position as shown in H. J. Graham, United States Patent 1,970,304, for "Elevator and Like Apparatus," which issued August 14, 1934. In R. W. Jones, United States Patent 1,966,206, of July 10, 1934, for "Electric Elevator System," floor selection control is effected with sequentially actuated and interlocked relays. More recently W. G. Hall, et al. disclosed a combination of elements for logic circuits to perform floor selector functions in their United States Patent 2,806,554 of September 17, 1957 entitled "Elevator Control Systems."

Each of the aforenoted prior systems have required complex actuating and resetting means which required an initial investment comparable to that of those commutating machines actuated from the elevator car or driving mechanism. They had fixed car slowdown intervals, and required registration of a call for a landing for a rigidly fixed interval and prior to the operation of the selector mechanism for that landing. They also were subject to certain malfunctions for which self-correcting means was not provided.

One object of the present invention is to facilitate the synchronization of elevator signals and controls with car position.

Another object is to increase the reliability and to decrease the complexity of floor selector mechanisms for elevators.

A third object is to afford a range of adjustment of the stopping interval for an elevator car by a simple means.

A further object is to facilitate the automatic correction of any malfunction occurring in an elevator system.

The above objects are realized in accordance with one embodiment of an elevator control and signal system according to the present invention as disclosed in detail below by means of a floor selector mechanism utilizing latching relays and reset circuits therefor which are actuated by predetermined sequences and coincidences of signals developed in response to car position in the hatchway, the direction for which the car is set to travel, and the history of car travel immediately preceding the current car condition. In particular, an odd floor relay and an even floor relay are alternately latched in and reset as a car proceeds from its lowest landing upward and individual floor relays are latched-in in response to the respective odd and even floor relays as the car proceeds to a zone embracing that landing. The floor relays are successively operated in a first sequence for up travel and a reversed sequence for down travel. Each floor relay operation issues a reset signal to the floor relays for all other landings. Each floor relay is responsive to a coincidence of three conditions, the direction for which the car is set to run, the state of the even floor relay, and the preceding landing from which the car traveled. In order to establish this coincidence the odd and even floor relays are actuated and intercoupled in a manner to condition their circuits for the transfer of state appropriate for the following landing during an interval the car passes between landing zones. The state of the even car relay is maintained between landing zones and until the car enters the next landing zone. These latching and resetting functions are facilitated by magnetic latch relays utilized in circuits, as disclosed in United States patent application Serial No. 632,064 filed in the name of R. A. Burgy on January 2, 1957 and entitled "Elevator Controls," wherein the latching-in of one relay insures the resetting of all others. This circuit form as utilized herein eliminates many of the holding and reset circuits required of the prior floor selector mechanisms.

Another aspect of the invention involves the use of a timer to define the interval of travel in the landing zone during which a call can be registered and the car respond thereto. This timer prevents an excessively abrupt stop of the car in response to a call registered for a landing after that car has passed the point at which a normal slowdown of the car is initiated. In the example, a flux decay relay is employed for this purpose and is adjusted as to its drop out interval in a conventional manner to adapt the system for an appropriate minimum slow down distance.

In some prior art systems the slowdown functions and the landing zone defining functions have been performed by separate elements. The present system employs a single actuator for both landing zone definition and slowdown. In systems operating a car at high speeds it may be necessary to actuate floor zones and initiate slowdown a substantial distance ahead of the landing and thus even before the car passes the preceding landing. The present system is arranged for such operation while utilizing only two actuators in the hatchway, one for zone definition the other for final leveling. When the zone is defined and slowdown initiated while the car is adjacent the leveling actuator of a preceding landing operation of the leveling circuits is prevented by a disabling means which delays the conditioning of the leveling devices for a given interval which can be on a time basis.

Synchronization of car position and the floor selecting mechanism is insured by a positive operation of a reset mechanism for the floor relays and their controls at a given landing which is a correction station at the terminals in the exemplary arrangement. Under many conditions wherein synchronization is lost, the car will proceed to the correcting station and be resynchronized. In those instances where the car is stalled at a landing other than the correcting station, the continuance of a demand for service for a predetermined time interval establishes a circuit which causes the car to travel to the station and thereby resynchronize the system. During the correcting operation this circuit prevents the car from making any stops to expedite resynchronization and cancels the calls for which the car was stalled so that the prospective passenger is apprised of the need to reregister the call after the car has been resynchronized.

The above and additional objects and features of this invention will be appreciated more fully from the following detailed description when read in conjunction with the accompanying drawings in which:

Fig. I is a schematic representation of an elevator operated in accordance with this invention;

Fig. II is a sequence chart showing the condition of even floor and odd floor relays while the car is at any of its possible positions on an up or down trip as correlated with respect to Fig. I by horizontal alignment therewith;

Fig. III is an across the line diagram of abbreviated brake, lift motor field, direction, leveling and floor selection control circuits;

Fig. IV is an across the line diagram of the slowdown circuits for the car controls of Fig. III;

Fig. V is an across the line diagram of the hall call and car call circuits of this system;

Fig. VI is an across the line diagram of the slowdown which initiate the floor selector functions of this invention;

Fig. VII is an across the line diagram of the instantaneous direction circuits for the present system; and Fig. VIII is an across the line diagram of failure circuits for the disclosed elevator system.

In Fig. I an elevator car 11 suspended by a cable 12 trained over a drive sheave 13 and supporting a counterweight 14 on its opposite end is shown. The car is driven along its hatchway by means of a lift motor 15 coupled to sheave 13 by shaft 16 which also supports a brake drum (not shown) for a brake 17. Five landings are shown along the hatchway. These landings are each provided with hall call registering devices 18 whereby an up call can be registered for any landing from which the car can travel upward, the first through the fourth landings, and a down call can be registered for any landing having a landing below it, the fifth through second landings. The car is provided with a control panel 19 upon which are located call registering means 21 for each landing.

Actuation of car controls in accordance with car position can be accomplished by a number of devices responsive to relative motion between one element mounted on the car and another mounted in critical relationship to the car supported element and the landings. These devices include switches actuated by cams, electromagnetic switches which respond to the presence of ferromagnetic elements such as vanes, and commutating contacts. In the illustrative embodiment permanent magnet inductor switches of the type shown in J. H. Borden United States Patent 2,598,214 of May 27, 1952, entitled, "Inductor Leveling Switch," are mounted on the elevator car and are arranged to close their contacts when, through car motion along the hatchway, they are brought into proximity with critically dimensioned and positioned ferromagnetic vanes in the hatchway. Four conventional leveling switches of this form are employed, first leveling units for the up and down direction 1LU and 1LD, respectively, and second leveling units for the up and down direction 2LU and 2LD, respectively. The leveling switches cooperate with a single leveling vane 22 in the hatchway at each landing centered with respect to the first leveling units so that the vane lies between those units and out of their range of influence when the car is stopped level with the floor. A floor selector unit SLU of the same construction as the leveling units is utilized to transfer operation of the floor selector circuits as the car advances along the hatchway and carries the unit into the range of influence of a floor selector unit actuator in the form of a ferromagnetic vane 23. Vanes 23 are positioned in the hatchway at each landing such that they are centered with respect to unit SLU when the car is level with that landing.

It is to be noted that vanes 23 define the landing zones for both directions of operation. Where car speed dictates a slowdown distance greater than approximately one half a floor height, separate floor zone vanes and magnetic inductor switches can be employed for each direction of travel and can be positioned nonsymmetrically with respect to the landings. Alternatively a single system of the vanes can be unsymmetrically disposed with respect to the landings and the assignment of those vanes to particular landings can be altered to assign the vanes to certain landings for up travel and to certain other landings for down travel. Thus the particular vane arrangement shown in Fig. I is merely illustrative and should not be interpreted as limiting this invention.

Fig. II keys operation of the primary floor selection circuit relays with car position as represented in Fig. I. The significance of this figure will be appreciated more fully from the description of the operation of the floor selector.

The remaining figures are circuit diagrams presented in across the line form. These diagrams show only fragments of a system for a single car. However, it is to be appreciated that the controls readily can be adapted by conventional techniques to multicar systems. The lifting motor circuits for the car are not shown since any of the known types can be employed. Further, many of the controls such as those for attendant operation in response to signals as an alternative for automatic operation, dispatching, programs to improve a particular type of service, car position and call indicators and many other aspects of elevator signalling and control can be incorporated with the features of this invention. Accordingly this disclosure is to be read as illustrative of the invention and not in a limiting sense.

In order to facilitate an understanding of the relationship between actuating means, ordinarily relay coils represented as circles embracing reference characters, and the actuated means, ordinarily contacts identified by adjacent reference characters corresponding to those assigned to the respective actuating means, a marginal key has been provided for each circuit diagram. In this key the position of elements in a band in horizontal alignment therewith has been signified by a line number appearing immediately to the right of the circuit. The center column of the key contains the reference characters for the operating coils which are located in the line or zone identified by the adjacent number in the first column. The line location of contacts actuated by the keyed coils are listed in the right-hand column of the key adjacent the reference character for the coil. Back contacts, those closed when the coil is deenergized and opened when it is energized, are differentiated from front contacts, those normally open and closed by energizing their actuating coil, by underlining the number indicating the line in which they appear. All elements in the circuits are shown in the condition they assume when their actuating coils are deenergized; although, it should be recognized that some contacts are displaced to the position they assume when their coils are energized throughout all or most of the operating interval of the system by virtue of having their operating coils energized over those intervals, and that others, particularly those having three leads to their operating coils, are of a type having magnetic latches which maintain their contacts displaced or "latched-in" after their operating coils, between the aligned leads, have been energized and until their reset coils, between the vertical and right-hand horizontal leads, have been energized. When both the latch and reset coils are energized the latch coils control the relay operation.

As a further aid to an appreciation of this system and its mode operation the various relay coils will be identified by their reference characters listed in alphabetical order in the following table, their names, and their line locations. These relays include:

| | |
|---|---|
| A1—Acceleration | 112 |
| BK—Brake | 103 |
| CB—Car button | 135 |
| CLA—Door close | 134 |
| D—Down direction | 109 |
| DD—Down direction | 109 |
| DF—Down field | 104 |
| D1—Instantaneous down direction | 179 |
| FT—Failure timer | 185 |
| FTA—Failure timer | 186 |
| HB—Hall button | 136 |
| HS—Slowdown | 133 |
| LD—Down leveling | 114 |
| LU—Up leveling | 113 |
| SD—Floor selection control | 116 |
| SDT—Slowdown control time | 117 |
| SD1—Even floor | 153 |
| SD2—Odd floor | 157 |
| S1-ST—First to top floor | 167, 165, 163, 161, 159 |
| S2C-S4C—Second to fourth floor car signal | 147, 143, 139 |
| S2D-STD—Second to top floor down landing signal | 148, 144, 140, 136 |
| S1U-S4U—First to fourth floor up landing signal | 151, 146, 142, 138 |
| TL—Leveling time | 111 |
| U—Up direction | 106 |
| UF—Up field | 102 |
| UU—Up direction | 106 |
| U1—Instantaneous up direction | 169 |
| 2L—Low speed leveling | 115 |

In addition to the above, certain contacts are shown without their actuating means. These contacts include:

| | |
|---|---|
| BP | By pass relay. |
| DL | Down direction locking relay. |
| OPN | Door open relay. |
| SE | Safe edge relay. |
| SLU | Selector unit. |
| TR | Start time relay. |
| UL | Up direction locking relay. |
| 1LD | First leveling down unit. |
| 1LU | First leveling up unit. |
| 2LD | Second leveling down unit. |
| 2LU | Second leveling up unit. |

Fig. III shows a greatly simplified diagram of the circuits controlling motion and position of the elevator car. It includes a brake relay BK which is energized while the car is set to move and actuates a number of circuits (not shown) including those for the lifting motor, the car brake, door operator, stop time and car acceleration control. Energization of the brake relay is accomplished through conventional safety switches 24 and door and gate limit switches 25 after those switches have been closed and direction of travel has been determined by energization of either up direction relays U and UU or down direction relays D and DD. When direction has been established an appropriate field relay up field relay UF or down field relay DF, is energized simultaneously with brake relay BK to establish the running direction for the motor (not shown), energize the leveling time relay TL and activate the floor relay circuits of Fig. VI.

The functions of the direction relays U, UU, D and DD of Fig. III include sealing themselves in and barring the operation of their counterparts for the opposite direction, the aforenoted field relay control, leveling time relay control, and establishment of the appropriate circuits for the travel direction for car slowdown in Fig. IV. Deenergization of leveling time relay TL while the car is running initiates its drop out interval. Upon dropping out, relay TL enables the leveling circuits of up leveling, down leveling and low speed leveling relays LU, LD and 2L, respectively. It is this delay in the drop out of relay TL which enables the floor zone definition and slowdown initiation to be actuated from a single source without stopping the car prematurely or with excessive abruptness. The slowdown relay HS can be deenergized while the car is in a position wherein one or more of the leveling units is within the range of influence of cam 22 for the floor ahead of that at which the car is to be stopped. Relay TL delays the enabling of the leveling relays until the car has proceeded beyond that region so that those relays are capable of operating only in response to the actuation of the leveling units by the leveling cam for the landing at which the car is to stop. This feature enables a wide range of slowdown from high speed operation since the initial deceleration can be effected in response to energization of slowdown relay HS through the deenergization of acceleration relay A1 while the car is in the leveling zone for a preceding landing, while operation of leveling is prevented by the delayed drop out of relay TL for an interval sufficient to pass that zone.

No circuits responsive to acceleration relay A1 of Fig. III are shown since they are of conventional form, for example, relay A1 changes the generator field current in a variable voltage control to alter the lift motor speed. The leveling relays LU, LD and 2L are also instrumental in altering the lift motor speed in successive steps (as by altering the generator field current in a variable voltage control), in opening the direction circuits to eliminate their control of the brake and field relays, and in assuming control of the brake and field relays to effect the final stopping of the car level with the landing.

Fig. III also includes floor selector control relay SD which is energized while a car is in a floor zone and is deenergized between floor zones by virtue of the operation of selector unit SLU. Relay SD deenergizes slowdown timer relay SDT, which can be of the flux decay type, enables slowdown relay HS of Fig. IV, and actuates the odd and even floor relays SD1 and SD2 of Fig. VI to effect the operation of the floor selector circuits.

Slowdown of a moving car is accomplished by the energization of slowdown relay HS of Fig. IV. This relay is energized in the usual car operation when there is a coincidence of car travel in a given direction, car presence in a given landing zone and a call for service in the travel direction at that landing provided the car has not been set to by-pass calls, the call was registered prior to the entry of the car into the zone or within a given interval following its entry, and no failure has occurred. Relay HS seals itself in until leveling is initiated and contacts UU or DD at lines 133 and 134 are opened. These contacts also control door close relay CLA so that upon the closure of either UU or DD that relay is energized to initiate closing of the door (by means not shown) and to enable the car to run. Relay CLA is maintained energized while the car runs to insure that the door opening controls cannot be operated.

Fig. V shows the call registering circuits for the landing signals and car signals. These circuits include resetting means. Each car call as registered by closure of a car call contact C1 through C5 for landings 1 through 5 energizes car button relay CB and initiates a car starting operation, if the car is stopped. A car call also energizes a car signal relay for its landing S2C to S4C in the case of landings intermediate the terminals and the top or bottom terminal signal relays STD or S1U in the case of the terminals. Similar down landing signal relays S2D, S3D, S4D and STD for the second, third, fourth and top floors are respectively energized by down hall buttons HD2, HD3, HD4 and HD5 located in the hall call registers 18 for those landings. Up landing signal relays S1U, S2U, S3U and S4U for the first, second, third and fourth floors are each energized from hall buttons 18 by closing contacts HU1, HU2, HU3 and HU4, respectively. A hall button relay HB is energized while any hall call is being registered to initiate operation of the car if it is dormant.

Each of the signal relays is of a latch type, advantageously a magnetic latch relay as disclosed in the aforenoted R. A. Burgy patent application. When energized, the signal relays are latched-in until a car stops at their respective landings and energizes their reset circuits between the vertical lead into the circle representing their coils and the lead extending to the right of the circle. It is to be noted that all calls at a landing are reset as the doors open, contacts OPN at line 142 are closed, and at the initiation of the car starting operation from the landing, contacts U1 and BK at line 143 or D1 at line 144 and BK at line 143 are closed. This feature is utilized in the exemplary single car system since service is rendered most expeditiously if all passengers enter when the car stops, thereby avoiding a second stop as the car returns past the landing to serve those passengers seeking to travel in the opposite direction.

The floor selector circuits of Fig. VI establish the signal and control paths required while a car is at a given position in its path of travel along the hatchway by energizing floor relays corresponding to the car position. Thus, while the car is in the vicinity of the second landing, second floor relay S2 is latched-in and all other floor relays S1, S3, S4 and ST for the first, third, fourth and top landings are reset. When the car enters the vicinity of an adjacent floor, the first floor on a down trip, first floor relay S1 is latched-in and second floor relay S2 is reset. The operation thereby simulates car travel as floor relay operation wherein a floor relay corresponding to car position is at all times latched-in and all other floor relays are reset.

Operation of the floor relays is effected by the coincidence of the setting of car travel direction by contacts DF or UF at lines 163 and 166, the car travel history as represented by the floor relay which is latched-in by virtue of the car's presence in the floor zone of an adjacent landing, and the condition of even floor relay SD1. Even and odd floor relays SD1 and SD2 are actuated by floor selector control relay SD and are interlocked to operate in a sequence where only one of the two relays is energized while the car is in a floor zone and therefore has relay SD energized, and both are in the same condition intermediate those floor zones. The odd floor relay SD2 is energized and latched-in when the car is at the first terminal by closure of bottom limit switch 26 and first floor relay S1 is energized and latched-in by closure of bottom limit switch 27. This synchronizes the selector at the beginning of a trip. It is resynchronized when at the top terminal by the closure of top limit switch 28 to energize top floor relay ST and by the energization of the main coil of odd floor relay SD2 if the car serves an odd number of landings through the closure of top limit switch 29 and switch 31 to lead 32, or by the energization of the reset coil of odd floor relay SD2, if the car serves an even number of landings, through limit switch 29, switch 31 and lead 33.

Odd floor relay SD2 is energized while the car is in an odd floor zone to maintain even floor relay SD1 deenergized. Conversely, even floor relay SD1 is energized while the car is at an even floor zone and deenergizes the odd floor relay SD2. While between floor zones, the energizing circuit for both the latch and reset coils of relay SD1 are open so that that relay remains in the condition established during its preceding energized interval. A path is closed which partially completes circuits for the latch and reset coils of relay SD2 at that time. SD1 has a back contact in the reset circuit of relay SD2 and a front contact in relay SD2 main coil circuit, the state of even floor relay SD1 determines the state of odd floor relay SD2 between floor zones. When an odd floor zone has been passed, relay SD1 is in its deenergized or reset state, hence in passing from an odd floor zone odd floor relay SD2 is reset. When an even floor zone has been passed, relay SD1 is latched-in to complete an energizing circuit for relay SD2 so that both SD1 and SD2 are latched in between floor zones as a car passes from an even floor zone. This relationship is illustrated in Fig. II showing that odd floor relay SD2 is latched-in while the car is in the first, third and fifth floor zones; that even floor relay SD1 is latched-in while the car is in the second and fourth floor zones; that both SD1 and SD2 are "out" or reset while the car is between floor zones and traveling from an odd floor zone as between the first and second or the third and fourth floors on an up trip, or the fifth and fourth or third and second floors on a down trip; and that both SD1 and SD2 are "in" while the car is between floor zones and traveling from an even floor zone.

The use of the even floor relay to control the floor relay family enables the next floor relay along the path of travel to be conditioned for energization without instituting that energization until the car enters the next floor zone, it being recalled that the even floor relay maintains the state it assumed while the car was in the preceding floor zone as it passed between the zones and changes its state as the car enters the next floor zone. Further, reversal of a car at a landing intermediate its terminals can be accomplished without disrupting the floor selector operation since even floor relay contacts in the up and down direction subcircuits, fed through contacts UF at line 166 and DF at line 163, are of like type for each floor relay. Thus an even floor relay back contact SD1 feeds third floor relay S3 for up travel at line 164 and for down travel at line 163. When that relay is energized contacts S3 at line 162 and line 165 are closed to partially complete paths to both the second and fourth floor relays. Even floor relay front contacts SD1 feed both of those floor relays so that the closure of up field contact UF and movement of the car into an even floor zone will energize S4 while the closure of down field contact DF and movement of the car into an even floor zone will energize S2.

The direction of travel of a car is initially established in the circuits of Fig. VII wherein instantaneous up direction relay U1 and instantaneous down direction relay D1 are energized by the registration of a call for service to a landing spaced from the current car position as indicated by the floor relays. The instantaneous direction relays in sensing the direction of a car or hall call from the car establish the direction circuits of Fig. III through relays U, UU, D and DD. They also enable the reset circuits for the landing and car signal relays at lines 143 and 144 of Fig. V. When they are deenergized and a call remains registered for a given interval, as might occur if the floor relays S1 to ST lost synchronism with the car position through a failure to latch-in or a false latching-in, relays D1 and U1 enable the failure timer FT of Fig. VIII.

Correction of a loss of synchronism between car and floor selector is assured by the circuit of Fig. VIII. When a call remains registered and no instantaneous direction relay is energized for a given interval, timer FT, which can be a motor driven timer which times out in 20 to 30 seconds, operates to energize auxiliary failure timer relay FTA. Relay FTA insures that the car travels to the lower terminal where its floor relays are reset and synchronized with car position. This resetting is expedited by preventing car stops on the downward trip through the opening of the circuit of the slowdown relay HS at contacts FTA at line 132. Contacts FTA at line 145 are also closed to cancel the call at the landing where loss of synchronism developed.

A better understanding of the circuits and their functions will be obtained from a consideration of their operation. Assume that the car is stopped at the first landing or lower terminal, that an up hall call is registered at the third landing by closing contact HU3 and that its start time relay TR (not shown) has timed out to close back contacts TR at line 110 of Fig. III. Closure of back contacts TR completes an energizing path for the up direction relays if the instantaneous up direction relay U1 has been energized by an up service requirement.

When HU3 is closed at line 142 of Fig. V, third floor up landing signal relay S3U is energized from lead 31 through leads 32, 33 and 34, contacts HU3, coil S3U and lead 35. S3U contacts are closed at line 173 to energize instantaneous up direction relay U1 through leads 36, 37 and 38, contacts S3U, S3, S4, S4 and ST, lead 39, contact ST and coil U1 to lead 41. S3U contacts at line 121 are closed in the slowdown circuit with no immediate effect. Contacts S3U at line 183 are closed to partially complete a circuit for the failure timer relay, that circuit being broken at line 185 by the opening of back contact U1 provided the instantaneous up direction relay operates as intended.

Relay U1 closes its contacts at line 107 to complete an energizing circuit for up direction relays U and UU from lead 42 through a series of safety switches 43, contacts SE of a door safe edge relay of conventional form (not shown), closed back contacts OPN of a door opening relay (not shown), lead 44, contacts TR at line 110, down direction locking relay contacts DL at line 107, lead 45, instantaneous up direction relay contacts U1, coils U and UU and down direction relay contacts DD to lead 46. Contacts U1 at line 143 are closed to energize the reset circuit of the signal relays for the landing at which the car is positioned, assumed to be the first landing, through lead 31, contacts U1, BK of the brake relay, lead 47, contacts S1 of the first floor relay, the reset terminal of S1U and lead 48 to lead 35. The opening of back contacts U1 at line 118 has no effect at this time, while the opening of contacts U1 at line 185 disables the failure timer FT.

Timing out of start time relay TR and the coincidence of operation of safe edge relay SE initiates the closing of the gate and door in a conventional manner (all by means not shown). When the gate and door are closed, their limit switches 25 at line 103 are closed to complete a circuit for the brake and field relays, the up field relay UF being energized through closed up direction contact UU at line 102, through a path from lead 42, through lead 49, a number of safety contacts 24, brake relay coil BK, lead 51, up field relay coil UF, back contacts DF, contacts UU, car and landing door contacts 25 and lead 46. Energization of brake relay BK initiates the start of the elevator car by energizing the lifting motor and the brake release coil (not shown) and by initiating the acceleration of the car. The brake relay also deenergizes the reset circuits for the signal relays by opening back contacts BK at line 143 and energizes the floor relays of Fig. VI by closing contacts BK at line 155.

Energization of the field relay as a car is started from a floor in the opposite direction from which it arrived resets the direction locking relay (not shown). The up field relay UF energizing the up direction locking relay UL under the assumed conditions, in a manner which is well known and therefore not shown. The up field relay locks out the down field relay DF by opening its back contacts UF at line 104, connects the motor fields for up travel by means not shown, closes contacts UF at line 166 to activate the up direction circuits of the floor relays and closes the leveling time relay TL and acceleration relay A1 circuits at line 111.

While the car is at the lower terminal, bottom limit switch 27 is closed so that first floor relay S1 is energized through lead 52 and its main coil and also through lead 53, contact S1 at line 168 and its reset coil. Since the main coil predominates when both are energized, both pairs of back contacts S1 at lines 178 and 179 are opened to insure the deenergization of instantaneous down direction relay D1. Relay S1 energizes the reset coil of first floor up landing signal relay S1U through lead 31, contacts U1 and BK at line 143, lead 47, contacts S1 at line 152, reset coil S1U and lead 48. It also conditions the next floor relay, second floor relay S2, for energization by closing contact S1 at line 166.

While the car is adjacent a landing, contact SLU at line 116 is closed by virtue of the proximity of its operating unit to an actuator in the hatchway. Therefore, floor selection control relay SD is energized at line 116 to close its contacts SD at line 131 and enable the slow down relay circuit to be energized if a call is present when the car is in the landing zone of the floor. The slowdown control relay SDT at line 117 is deenergized by the opening of back contact SD to initiate its drop out timing interval. When relay SDT drops out it opens contacts SDT at line 132 to disable the energizing circuit for slowdown relay HS. Thus, the car will stop if a call is registered prior to its entry into the landing zone and for an interval established by relay SDT following that entry. Contacts SD at line 153 to the even floor relay SD1 are closed while back contacts SD to the odd floor relay SD2 at line 157 are opened; however, while the car is at the first landing bottom limit switch 26 is closed to insure the energization of relay SD2, when the brake relay is energized. Relay SD2 is energized through lead 55, contacts BK at line 155, lead 56 and 57, switch 26, the main coil of relay SD2 and lead 58. Thus, the car always starts away from the first landing with relay SD2 energized.

The energization of relay SD2 closes contacts SD2 at line 154 in the reset circuit of relay SD1 and opens back contacts SD2 at line 153 in the main coil circuit of that relay. Since contacts SD are closed at line 153, relay SD1 is always reset when the car starts away from the first landing.

As the car moves upward from the first landing and out of the first landing zone the operating unit for contacts SLU is moved out of the effective range of the first landing fixed actuator 23—1 in the hatchway and contacts SLU open to deenergize floor selection control relay SD. This opens the slowdown relay circuit by opening contacts SD at line 130, energizes the slowdown control time relay SDT by closing contacts SD at line 117 and interchanges the energization circuits for even floor relay SD1 and odd floor relay SD2 by closing contacts SD at line 157 and opening contacts SD at line 153. At this time, relay SD1 is dropped out so that back contacts SD1 at line 158 are closed and contacts SD1 at line 157 are opened. A reset circuit is therefore completed for relay SD2 through contacts SD at line 157 and contacts SD1 at line 158 to lead 58. Relay SD2 drops out closing contacts SD2 at line 153 in the main coil circuit of relay SD1 and opens the reset circuit at contacts SD2 in line 154. Thus as the car passes between the first and second landing both relays SD1 and SD2 are dropped out.

Further upward travel of the car brings the operating unit for contacts SLU into the range of influence of the hatchway actuator for the second landing to close contacts SLU and energize floor selection control relay SD. Since no call is registered for the second landing, the closure of contacts SD at line 130 and the opening of contacts SDT at line 131 shortly thereafter has no effect.

The interchange of energizing paths for the odd and even floor relays by closing contacts SD at line 153 and the opening of contacts SD at line 157 pulls in relay SD1 by energizing its main coil through contacts SD and contact SD2 at line 153 and lead 58. Closure of contacts SD1 at line 157 prepares odd floor relay SD2 for energization upon the next drop out of relay SD while the opening of back contacts SD1 at line 158 disables the reset circuit of relay SD2. Back contacts SD1 at lines 163 and 164 are opened and contacts SD1 at line 165 are closed with no effect at this time. Contacts SD1 at line 166 are closed to energize the second floor relay S2 through lead 55, contacts BK at line 155, lead 56, contacts UF, SD1 and S1 at line 166, leads 59 and 61, main coil of relay S2 and lead 58.

Energization of relay S2 signifies that the car is effectively at the second landing. It resets all other floor relays by closing contacts S2 at line 166 to energize reset lead 62 connected to each floor relay reset coil through isolating rectifiers 63 which bar feedback to the main coils. Thus, relay S1 drops out. Relay S2 conditions the next adjacent floor relays for energization by closing contacts S2 at lines 164 and 167. In addition it performs the commutating functions often realized with an array of commutating brushes and cam actuated contacts on a floor selector machine by isolating the second landing controls of the instantaneous direction control circuit through the opening of back contacts S2 at line 176 and 177, by closing a portion of the slowdown circuit to render it responsive to any registered call for the second landing to which it might respond while traveling upward through contacts S2 at line 123, by operating car position indicators (not shown), and by resetting the signals at the landing if the car stops at that landing by closing contacts S2 at line 149.

The car proceeds beyond the second landing without stopping under the assumed conditions, since no call is registered for that landing. As its operating unit is carried out of the range of the actuator by movement of the car upward toward the third landing, contacts SLU open to deenergize relay SD thereby closing contacts SD at line 157 and opening contacts SD at line 153. Since relay SD1 is latched in its energized position, the main coil SD2 is energized through lead 56, contacts SD and SD1 at line 157 and lead 58. This latches contacts SD2 at line 153 open and contacts SD2 at line 159 closed.

Further travel of the car upward carries the operating unit into the third landing zone and into the range of the third landing actuator to close contacts SLU and energize relay SD. Relay SD closes its contact SD at line 153 to complete a resetting circuit for relay SD1 from lead 56 through contacts SD and SD2 at line 154 to the reset coil SD1 and lead 58. Relay SD1 in dropping out conditions the odd floor relay SD2 to be reset as the car passes from the third to the fourth landing by closing back contacts SD1 at line 158 and opening contacts SD1 at line 157. It also signifies to the floor relays the passage of the car into the vicinity of the third landing by closing back contacts SD1 at line 163 and opening front contacts SD1 at lines 165 and 166 with no effect during up travel, and by closing back contacts SD1 at line 164 to complete through up field relay contacts UF at line 166, second floor relay contacts S2 at line 164, leads 64 and 65, main coil S3 and lead 58, an energizing circuit for third floor relay S3. When relay S3 pulls in, it closes its contacts S3 at line 164 to activate the reset lead 62 and reset second landing relay S2.

Third floor relay S3 isolates the third floor signal contacts from the instantaneous direction relay circuits by opening back contacts S3 at lines 173 and 174. If no call is registered above the third landing, relay U1 is deenergized since its energizing path through contacts S3U at line 173 is opened by contacts S3 at line 173. A passenger desiring to travel upward from the third landing must enter the stopped car and register a car call for a landing above in order to reenergize relay U1. Relay S3 resets the third floor landing and car signals by closing contacts S3 at line 145 to energize the reset coils of latch relays S3U, S3C, and S3D through lead 31 contacts U1 and BK at line 143, lead 47, contacts S3, lead 66 and the several reset coils to lead 35.

The car is slowed at the third landing by the energization of slowdown relay HS through lead 67, closed contacts BP of a by-pass relay (not shown), and third floor up landing signal relay contacts S3U at line 121, third floor relay contacts S3 at line 121 and up direction relay contact U at line 123, lead 68 closed floor selection contact SD at line 130, closed failure timer relay FTA at line 131, closed slowdown control relay SDT at line 132, relay HS and up direction relay contacts UU at line 133. Relay HS seals itself in by closing contacts HS at line 133 prior to the drop out of contacts SDT at line 132. It also initiates deceleration of the car by means not shown and deenergizes leveling time relay TL by opening back contacts HS at line 111. Relay S3 also operates a car position indicator for the third landing (not shown).

Car leveling controls are shown in Fig. III. As the car approaches a landing for which a call is registered and its slowdown relay HS is energized the leveling controls are deenergized since back contacts TL at line 114 are open. Shortly after contacts HS are opened, leveling time relay TL times out and permits its back contacts TL at line 114 to close. When the operating units for contacts 1LU at line 113, enter the region of influence of the leveling actuator 22—3 in the hatchway adjacent the third landing, relay LU is energized to slow the lifting motor further (in a manner not shown), open a portion of the circuit energizing relays U and UU at back contact LU in line 106, and establish an alternate holding circuit for the up field and brake relays by closing contacts LU at line 101.

Relays SD, SDT and TL introduce some flexibility in the operation of the slowdown and leveling of the car. Usually a call will be registered at the time relay SD is operated and thus slowdown is initiated at a fixed distance from the landing. However, calls registered thereafter will be answered if within a fixed time interval following the entry of the car into the landing zone since relay SDT has not timed out. The interval for relay SDT can be adjusted, for a car running at about 400 feet per minute, to afford a range of six inches to a foot of operation within the first portion of the landing zone where a registered signal can stop the car without danger or discomfort to passengers. Upon operation of relay HS and the initiation of slowdown, an interval is initiated at the termination of which the leveling circuits for the car are rendered responsive. This delay in conditioning the leveling circuits by leveling time relay TL enables slowdown to be initiated at the time the car enters a landing zone even though it is sufficiently close to a preceding landing to position its leveling unit in proximity to the leveling actuator for that landing. Thus, the time interval for relay TL is adjusted to be sufficient for the car to move the leveling unit out of the vicinity of leveling actuators for preceding landings and to permit the car to be slowed under the control of relay A1 before the leveling units are made responsive to the actuators for the landing at which the car is to be stopped. Timer relays SDT and TL can readily be adjusted by known techniques to provide the desired deceleration and stop response characteristics.

As the car advances toward its leveling position at the third landing contacts 2LU and then 2LD are closed to energize the low speed leveling relay 2L through lead 42, contacts TL at line 114, lead 69, and contacts 2LU and 2LD at line 115. Relay 2L enables the door opening circuits so that door operation is initiated by circuits of conventional form (not shown).

The final position of the car at the landing is determined by the movement of the operator for contacts 1LU out of the region of influence of the actuator in the hatchway so that contacts 1LU open. In the final leveling position of the car relay LU is deenergized by the opening of contacts 1LU so that contacts LU at line 101 are opened and the up field and brake relays drop out to deenergize the lifting motor and set the car brake.

If a passenger enters the car at the third landing and registers a top floor car signal on push button C5 at line 136, top floor down landing signal relay STD is pulled in and latched through car button relay CB. Closure of contacts SDT at line 169 energizes instantaneous up direction relay U1 and conditions the car control circuits for up travel. If the safe edge contacts SE are closed at line 106, the car is immediately started upward by the closure of contacts CB at line 109 around start time relay contacts TR at line 110. Alternatively, the registration of a call at a landing above the car, as at the top landing by the closure of button contacts HD5 to latch relay STD in its energized position and energize hall button relay HB, will set the car for upward travel so that upon the timing out of the start time relay to close contacts TR, the car is started upward.

The relay system comprising the floor selector operates in the sequence described so that between the third and fourth landings both the even and odd floor relays SD1 and SD2 are in their deenergized state. While the car is in the vicinity of the fourth landing, even floor relay SD1 is latched-in and odd floor relay is dropped out so that fourth floor relay S4 is energized and third floor relay S3 is reset. Between the fourth and top landings both of the even and odd floor relays are in their energized state by virtue of the drop out of relay SD. As the car approaches the top landing, the fifth, the odd floor relay SD2 is latched-in and the even floor relay SD1 is dropped out.

A correcting circuit is provided at the top terminal to insure that the floor relays are synchronized with car position. This circuit is operated by limit switches 28 and 29 which are closed while the car is at that terminal. In the illustrated five landing system the top floor is an odd floor, therefore it is necessary that the odd floor relay be energized and the even floor relay be deenergized. This is insured through lead 71 and top limit switch 29, through switch 31 and lead 32 to the latch coil of relay SD2 whereby the reset coil of relay SD1 is energized through contacts SD at line 153 and contacts SD2 at line 154. Had the car served an even number of landings, as where the top landing is the fourth, the latching of even floor relay SD1 and drop out of relay SD2 could be insured by connecting lead 71 to lead 33 through switch 31 whereby the closing of top limit switch 29 energized the reset coil of relay SD2 to close back contact SD2 at line 153 and energize latch coil SD1. Latching of the top floor relay ST is also insured while the car is at the top terminal by the closing of top limit switch 28 in lead 72 to the latch coil ST whereby contacts ST at line 160 are closed to energize reset lead 62 and thus the reset coil of floor relays S1 to ST. As the car enters the top landing zone and relay ST is energized back contacts ST at line 169 are opened to deenergize relay U1. The closure of back contacts U1 at line 118 insures that slowdown is initiated for an up traveling car by energizing slowdown relay HS from lead 67 through lead 73, contacts U1, lead 74, contacts U at line 123, lead 68, contacts SD at line 130, contacts FTA at line 131, contacts SDT at line 132 and contacts UU at line 133 to lead 75. Back contact D1 at line 131 effects slowdown of a down traveling car at the lower terminal in a similar manner.

Down operation of the relays comprising the floor selector is similar to up operation. While traveling downward, the instantaneous down direction relay D1, down direction relays D and DD, the down portions of the slowdown circuit connected through contacts D at line 129 and the down portions of the circuits controlling floor relays ST to S1 through down field relay contacts DF at line 163 are all effective.

The above type of selector operation relies upon a proper sequence of operations of floor selection control relay SD and even and odd floor relays SD1 and SD2 to establish and to maintain operated a floor relay S1 through ST corresponding to the position of the car in the hatchway. When the car is at its limits of travel such operation is assured by the closing of limit switches 26 and 27 at the bottom to latch the odd floor relay SD2 and the first floor relay S1. At the top landing limit switches 28 and 29 are closed to latch or reset the odd floor relay SD2, depending upon whether the top floor is an odd or an even floor, and to latch the top floor relay ST. However, no positive reset mechanism is available at floors intermediate the terminals in the present utilization although such a mechanism could be installed, e. g. as a cam operated contact in the hatchway operated while the car is adjacent a landing to latch the floor relay for that landing, reset all other floor relays, and latch or reset the odd floor relay depending upon the floor chosen.

One form of failure of the floor selector involves the failure of a floor relay to latch-in. This results in all floor relays being reset. Under such circumstances, a running car continues to its terminal and has its floor selector circuits reset at that terminal since its instantaneous direction relays U1 and D1 remain energized through the closed series of back contacts S1 through ST and any service call, while the slowdown relay HS cannot be energized through any of contacts S2 through S4.

Similarly, if the floor relays are out of step with the car position and the car is ahead of the landing having its floor relay energized and there is a call at the terminal toward which the car is traveling or at a landing adjacent that terminal, the car will run to its terminal and reset its floor selector circuits at that terminal. However, if the car is ahead of the landing having its floor relay energized and no call is registered for the terminal or the landing adjacent the terminal, or if the car is behind the landing for which the floor relay is energized, it can be stopped at a landing having no current service requirement and stalled at that landing.

If the car is ahead of the floor relay, as where a floor relay fails to latch on one operation of the even floor relay SD1, an up hall call at the third landing will latch relay S3U and the advance of the car to the third landing will latch relay S2. No slowdown circuit is completed by this operation hence the car continues upward. When the car reaches the fourth landing it latches relay S3 to complete a slowdown circuit for relay HS from lead 67 through the by-pass, relay contacts BP at line 121, contacts S3U and S3 at line 121, contacts U at line 123, contacts SD at line 130, contacts FTA at line 131, contacts SDT at line 132, coil HS and contacts UU at line 133. Thus, the car is stopped. Instantaneous up direction relay U1 is deenergized. Since no prospective passenger has registered a call at the fourth landing, no one enters the car. Therefore the car stands at the fourth landing with its U1 relay dropped out. The prospective passenger at the third floor observes the cancellation of his call registration at this time, as by the darkening of an illuminated hall call button, and in the absence of a car stop he reregisters his hall call. The call was canceled by the closing of door open contacts OPN during the opening of the door. This reset circuit is not available after the door is fully opened. Hence, relay S3U is again latched. In this state contacts S3U at line 183 are closed to complete an energizing path from lead 76 through leads 77 and 78 to failure timer FT, through closed contacts U1, and D1 at line 185 to lead 79. Relays U1 and D1 are deenergized since the S3U contacts at line 173 are isolated therefrom by open back contacts S3 at lines 173 and 174.

Failure timer FT can be of the motor driven type and can be arranged to time out in about 20 to 30 seconds. Upon timing out, contacts FT at line 186 are closed to energize relay FTA which remains energized thereafter and until the car doors are opened again, through a holding circuit from lead 76 through contacts FTA at line 187 and door open back contacts OPN at line 186.

Relay FTA causes the car to start and travel directly to the lower terminal by supplanting the functions of the instantaneous direction relays in the direction circuits. It closes contacts FTA at line 110, to complete an energizing path for down direction relays D and DD from lead 42 through contacts SE at line 106, contacts TR, UL, and FTA at line 110, lead 81, and contacts UU at line 109, thereby starting the car downward. No stops are made on this selector relay resetting trip to the lower terminal since the slowdown relay HS has its energizing circuit opened at back contacts FTA at line 131. Further as soon as relay FTA pulls in, all calls at the landing having its floor selector relay energized are reset since contacts FTA at line 145 are closed as are the back contacts BK of the brake relay at line 143 and the contacts S3 at line 145. Thus, the car travels to its lower terminal closes bottom limit contacts 26 and 27 and resets the selector relays.

A pattern of failure operation similar to the above will develop if the floor relay for the landing ahead of the car is operated. Thus the car will stop at the landing below that for which the call is registered and cancel the call registration. Thereafter the passenger or prospective passenger will reregister their call. That call will not energize the instantaneous direction relay but will initiate the timing out of the failure timer FT. In a suitable interval relay FTA will be pulled in to cancel the call, start the car toward the lower terminal and disable the slowdown circuit during the trip to that terminal.

The control system can be summarized as one wherein a first control element, vanes 23, for each landing is positioned in the car hatchway in predetermined spaced relationship to the landings and a second control element, selector control unit SLU, cooperating with the first element is mounted to move along the hatchway with the car. One of the control elements is placed in operated condition while the elements are in a given spatial relationship, the operating element being car mounted unit SLU although a switch might be mounted in the vicinity of each landing for actuation by car travel to perform the control functions. First and second latching relays, even floor relay SD1 and odd floor relay SD2, each including a main coil to establish a latched condition and a reset coil to release said latched condition, are operated in response to the control element during alternate operating intervals thereof so that relay SD1 is latched-in while the car is effectively at even landings and relay SD2 is latched-in while it is effectively at odd landings. When the one control element, unit SLU, is operated, it conditions the circuits of the main and reset coils of the first latching relay SD1 for energization by closing contacts SD at line 153, and while it is quiescent it conditions the circuits of the main and reset coils of the second latching relay SD2 for energization by closing back contacts SD at line 157. The latching relays are interrelated in their operation so that the first, SD1, when latched, conditions the main coil of the second, SD2 for energization by closing contacts SD1 at line 157 and, when reset, conditions the second reset coil for energization by closing back contacts SD1 at line 158, while the second, SD2, when latched, conditions the first reset coil for energization by closing contacts SD2 at line 154 and, when reset, conditions the first latch coil for energization by closing back contacts SD2 at line 153. These latch relays actuate floor switches, relays S1, S2, S3, S4 and ST, in a given sequence in cooperation with direction responsive means, contacts DF at line 163 and UF at line 166, by means of back contacts SD1 at lines 163 and 164 and front contacts SD1 at lines 165 and 166. A portion of the individual floor switch controls also includes contacts from the floor switches for adjacent landings to insure sequencing. This sequencing is established at a station in the hatchway so that the car position is synchronized with the floor switch for the landing in the vicinity of the station and the appropriate latch relay is properly set. In the example, the first landing is a reset station, hence, S1 and SD2 are operated by means actuated by the presence of the car at the station such as switches 26 and 27. Calls for service registered by operating relays S1U, S2D, S2C, S2U, S3D, S3C, S3U, S4D, S4C, S4U or STD operate relays U1 or D1 to indicate the direction of a registered call from the position of the car. A call actuates a slowdown means, relay HS, if registered when car movement actuates the corresponding floor switch and for a given interval thereafter as measured by timer SDT, to initiate operation of car leveling mechanism, relays LU, LD and 2L, a predetermined interval after operation of HS as measured by leveling time relay TL. These calls also operate a failure timer FT if registered for a predetermined interval while the call direction means U1 and D1 are inoperative. As a result of a malfunction in the system, the operated timer FT causes relay FTA to operate and in turn causes the car to travel to the reset station by closing contacts FTA at line 110, to reset the call registering means by closing contacts FTA at line 145, and to disable the slowdown means HS by opening contacts FTA at line 131. This expedites the resynchronization of the car with the floor switches and latch relays.

What is claimed is:

1. In an elevator system, an elevator car, a hatchway for said car, a plurality of landings served by said car, a first control element for each landing each positioned in the hatchway in predetermined spaced relationship to said landing, a second control element cooperating with said first element and mounted to move along said hatchway with said car, one of said elements being in operated condition while said elements are in a given spatial relationship, a first and a second latching relay each including a main coil to establish a latched condition and a reset coil to release said latched condition, said one control element when operated conditioning for energization the circuit of said main and reset coils of said first latching relay, said one control element when quiescent conditioning for energization the circuits of said main and reset coils of said second latching relay, said latched first latching relay conditioning said second latching relay main coil for energization, said reset first latching relay conditioning said second latching relay reset coil for energization, said latched second latching relay conditioning said first latching relay reset coil for energization, said reset second latching relay conditioning said first latching relay latch coil for energization, a floor switch for each landing and actuated by said latching relays in a given sequence, a station in said hatchway in the vicinity of a given landing, means actuated by the presence of the car at said station for energizing the latching coil of one of said latching relays and for operating the floor switch for the given landing, means for registering calls for service to said landings, means for establishing the direction of a registered call from the position of the car, slowdown means for said car responsive for a given interval following the initiation of operation of said one element to a coincidence of a registered call for car travel in a given direction at a landing, travel of the car in said given direction, and the operation of the floor switch for that landing, a leveling mechanism for said car, means to condition said leveling mechanism for operation a predetermined interval after the slowdown means is operated, a failure timer responsive to the maintenance of an operated call registering means in coincidence with the failure of operation of a call direction means for a given failure interval to indicate a loss of synchronism between the car position and the floor switches, and means responsive to said failure timer for causing the car to travel to said station, for resetting said call registering means, and for disabling said slowdown means whereby said car is expeditiously resynchronized with its floor switches and its latch relays.

2. In an elevator system, an elevator car, a hatchway for said car, a plurality of landings served by said car, a first control element for each landing each positioned in the hatchway in predetermined spaced relationship to said landing, a second control element cooperating with said first element and mounted to move along said hatchway with said car, one of said elements being in operated condition while said elements are in a given spatial relationship, first means operated during alternate intervals of operation of said one element and reset by the intermediate intervals of operation of said one element, second means operated by the intermediate intervals of operation of said one element and reset by the alternate intervals of operation of said one element, floor switches successively operated by said means, a station in said hatchway in the vicinity of a given landing, means independent of said one element and responsive to the presence of said car at said station for actuating the floor switch for the given landing and conditioning said first and second means to a predetermined state, and means responsive to the presence of the car at a landing other than said given landing coincidental with the operation of a floor switch for another landing for causing said car to run to said station.

3. In an elevator system, an elevator car, a hatchway for said car, a plurality of landings served by said car, a first control element for each landing each positioned in the hatchway in predetermined spaced relationship to said landing, a second control element cooperating with said first element, and mounted to move along said hatchway with said car, one of said control elements being responsive when said elements are in a given spatial relationship, a first and second latching relay each including a main coil to establish a latched condition and a reset coil to release said latched condition, said one control element when responsive conditioning said main and reset coil circuits of said first latching relay for energization, said one control element when nonresponsive conditioning said main and reset coil circuits of said second latching relay for energization, means responsive to the latched first latching relay for conditioning said second latching relay main coil for energization, means responsive to the reset first latching relay for conditioning said second latching relay reset coil for energization, means responsive to the latched second latching relay for conditioning said first latching relay reset coil for energization, and means responsive to the reset second latching relay for conditioning said first latching relay latch coil for energization.

4. In an elevator system, an elevator car, a hatchway for said car, a plurality of landings served by said car, a first control element for each landing each positioned in the hatchway in predetermined spaced relationship to said landing, a second control element cooperating with said first element and mounted to move along said hatchway with said car, one of said control elements being responsive when said elements are in a given spatial relationship, a first and second latching relay each including a main coil to establish a latched condition and a reset coil to release said latched condition, said one control element when responsive conditioning said main and reset coil circuits of said first latching relay for energization, said one control element when nonresponsive conditioning said main and reset coil circuits of said second latching relay for energization, means responsive to the latched first latching relay for conditioning said second latching relay main coil for energization, means responsive to the reset first latching relay for conditioning said second latching relay reset coil for energization, means responsive to the latched second latching relay for conditioning said first latching relay reset coil for energization, means responsive to the reset second latching relay for conditioning said first latching relay latch coil for energization, a floor switch for each landing, and means responsive to said latching relays for actuating said floor switches in a given sequence.

5. In an elevator system, an elevator car, a hatchway for said car, a plurality of landings served by said car, a first control element for each landing each positioned in the hatchway in predetermined spaced relationship to said landing, a second control element cooperating with said first element and mounted to move along said hatchway with said car, one of said control elements being responsive when said elements are in a given spatial relationship, a first and second latching relay each including a main coil to establish a latched condition and a reset coil to release said latched condition, said one control element when responsive conditioning said main and reset coil circuits of said first latching relay for energization, said one control element when nonresponsive conditioning said main and reset coil circuits of said second latching relay for energization, means responsive to the latched first latching relay for conditioning said second latching relay main coil for energization, means responsive to the reset first latching relay for conditioning said second latching relay reset coil for energization, means responsive to the latched second latching relay for conditioning said first latching relay reset coil for energization, means responsive to the reset second latching relay for conditioning said first latching relay latch coil for energization, a floor switch for each landing, means responsive to one of said latching relays when said car is set for travel in a first given direction for actuating said floor switches in a first sequence, and means responsive to said one of said latching relays when said car is set to travel in a second given direction for actuating said floor switches in a second sequence.

6. In an elevator system, an elevator car, a hatchway for said car, a plurality of landings served by said car, a first control element for each landing each positioned in the hatchway in predetermined spaced relationship to said landing, a second control element cooperating with said first element and mounted to move along said hatchway with said car, one of said control elements being responsive when said elements are in a given spatial relationship, a floor switch for each landing, means responsive to said one control element for actuating said floor switches in a given sequence, a slowdown means responsive to said one control element, and timer means responsive to said one control element for terminating the interval during which said slowdown means is responsive.

7. In an elevator system, an elevator car, a hatchway for said car, a plurality of landings served by said car, a first control element for each landing each positioned in the hatchway in predetermined spaced relationship to said landing, a second control element cooperating with said first element and mounted to move along said hatchway with said car, one of said control elements being responsive when said elements are in a given spatial relationship, a floor switch for each landing, means responsive to said one control element for actuating said floor switches in a given sequence, means for registering a call for service at each landing, a slowdown means responsive to a coincidence of a call for a given landing, a responded floor switch for that landing and the response of said one control element, and timer means responsive a given interval after the response of said one control element for terminating the interval during which a response of said slowdown means can be initiated.

8. In an elevator system, an elevator car, a hatchway for said car, a plurality of landings served by said car, a first control element for each landing each positioned in the hatchway in predetermined spaced relationship to said landing, a second control element cooperating with said first element and mounted to move along said hatchway with said car, one of said control elements being responsive when said elements are in a given spatial relationship, a floor switch for each landing, means responsive to said one control element for actuating said floor switches in a given sequence, means for registering a call for service at each landing, and a slowdown means responsive for a given interval to a coincidence of a call for a given landing and the response of a floor switch for that landing.

9. In an elevator system, an elevator car, a hatchway for said car, a plurality of landings served by said car, a first control element for each landing each positioned in the hatchway in predetermined spaced relationship to said landing, a second control element cooperating with said first element and mounted to move along said hatchway with said car, one of said control elements being responsive when said elements are in a given spatial relationship, a floor switch for each landing, means responsive to said one control element for actuating said floor switches in a given sequence, slowdown means responsive to said one control element, means for leveling the car at a landing, and means for conditioning said leveling means for operation only after the expiration of a given interval following the response of said one control element.

10. In an elevator system, an elevator car, a hatchway for said car, a plurality of landings served by said car, a first control element for each landing each positioned in the hatchway in predetermined spaced relationship to said landing, a second control element cooperating with said first element and mounted to move along said hatchway with said car, one of said control elements being responsive when said elements are in a given spatial relationship, a floor switch for each landing, means responsive to said one control element for actuating said floor switches in a given sequence, slowdown means responsive to said one control element, means for leveling the car at a landing, and means for conditioning said leveling means for operation a given interval following the response of said slowdown means.

11. In an elevator system, an elevator car, a hatchway for said car, a plurality of landings served by said car, a first control element for each landing each positioned in the hatchway in predetermined spaced relationship to said landing, a second control element cooperating with said first element and mounted to move along said hatchway with said car, one of said control elements being responsive when said elements are in a given spatial relationship, a floor switch for each landing, means responsive to said one control element for actuating said floor switches in a given sequence, call registering means for each landing, slowdown means responsive to a call registration for a given landing and operation of a floor switch for that landing, means for leveling the car at a landing, and means for conditioning said leveling means for operation a given interval following the response of said slowdown means.

12. In an elevator system, an elevator car, a hatchway for said car, a plurality of landings served by said car, a first control element for each landing each positioned in the hatchway in predetermined spaced relationship to said landing, a second control element cooperating with said first element and mounted to move along said hatchway with said car, one of said control elements being responsive when said elements are in a given spatial relationship, a floor switch for each landing, means responsive to said one control element for actuating said floor switches in a given sequence, and means responsive to the presence of the car at a landing coincidental with the operation of a floor switch for another landing for resetting the operated floor switch and operating the floor switch for the landing at which the car is located.

13. In an elevator system, an elevator car, a hatchway for said car, a plurality of landings served by said car, a first control element for each landing each positioned in the hatchway in predetermined spaced relationship to said landing, a second control element cooperating with said first element and mounted to move along said hatchway with said car, one of said control elements being responsive when said elements are in a given spatial relationship, a floor switch for each landing, means responsive to said one control element for actuating said floor switches in a given sequence, a station in said hatchway in the vicinity of a given landing, means responsive to the presence of the car at said station for actuating the floor switch for the given landing, and means responsive to the presence of the car at a landing other than said given landing coincidental with the operation of a floor switch for another landing for causing said car to run to said station.

14. In an elevator system, an elevator car, a hatchway for said car, a plurality of landings served by said car, a first control element for each landing each positioned in the hatchway in predetermined spaced relationship to said landing, a second control element cooperating with said first element and mounted to move along said hatchway with said car, one of said control elements being responsive when said elements are in a given spatial relationship, a floor switch for each landing, means responsive to said one control element for actuating said floor switches in a given sequence, means for stopping the car at said landings, a station in said hatchway coinciding with a given landing, means responsive to the presence of the car at said station for actuating the floor switch for the given landing, failure means responsive to a loss of synchronism between the car position and the operated floor relay, means responsive to said failure means for causing said car to run to said station, and means responsive to said failure means for rendering said car nonresponsive to said stopping means.

15. In an elevator system, an elevator car, a hatchway for said car, a plurality of landings served by said car, a first control element for each landing each positioned in the hatchway in predetermined spaced relationship to said landing, a second control element cooperating with said first element and mounted to move along said hatchway with said car, one of said control elements being responsive when said elements are in a given spatial relationship, a floor switch for each landing, means responsive to said one control element for actuating said floor switches in a given sequence, means for registering calls for service, means for stopping the car at said landings, a station in said hatchway coinciding with a given landing, means responsive to the presence of the car at said station for actuating the floor switch for the given landing, failure means responsive to a loss of synchronism between the car position and the operated floor relay, means responsive to said failure means for causing said car to run to said station, means for canceling registered service calls in response to said failure means, and means responsive to said failure means for rendering said car nonresponsive to said stopping means.

16. In an elevator system, an elevator car, a hatchway for said car, a plurality of landings served by said car, a first control element for each landing each positioned in the hatchway in predetermined spaced relationship to said landing, a second control element cooperating with said first element and mounted to move along said hatchway with said car, one of said control elements being responsive when said elements are in a given spatial relationship, a floor switch for each landing, means responsive to said one control element for actuating said floor switches in a given sequence, means for registering calls for service, means for sensing the direction of a call from the position of the car, and failure sensing means responsive to the operation of said call registering means coincidental with the absence of operation of said direction sensing means.

17. A combination according to claim 16 including a station in said hatchway in the vicinity of a given landing, means responsive to the presence of the car at said station for actuating the floor switch for the given landing, and means responsive to said failure sensing means for causing said car to run to said station.

18. A combination according to claim 16 including a station in said hatchway in the vicinity of a given landing, means responsive to the presence of the car at said station for actuating the floor switch for the given landing, means for stopping the car at said landing, and means responsive to said failure sensing means for causing said car to run to said station and for rendering said car nonresponsive to said stopping means.

No references cited.

UNITED STATES PATENT OFFICE
CERTIFICATE OF CORRECTION

Patent No. 2,875,853

March 3, 1959

Joseph H. Borden et al.

It is hereby certified that error appears in the printed specification of the above numbered patent requiring correction and that the said Letters Patent should read as corrected below.

Column 3, line 34, for "slowdown" read -- floor relays --; column 5, line 12, after "mode" insert -- of --.

Signed and sealed this 23rd day of June 1959.

(SEAL)
Attest:

KARL H. AXLINE
Attesting Officer

ROBERT C. WATSON
Commissioner of Patents